July 1, 1924.
E. A. BIENENSTOK
WELDING MACHINE
Filed July 2, 1923
1,499,498
2 Sheets-Sheet 1
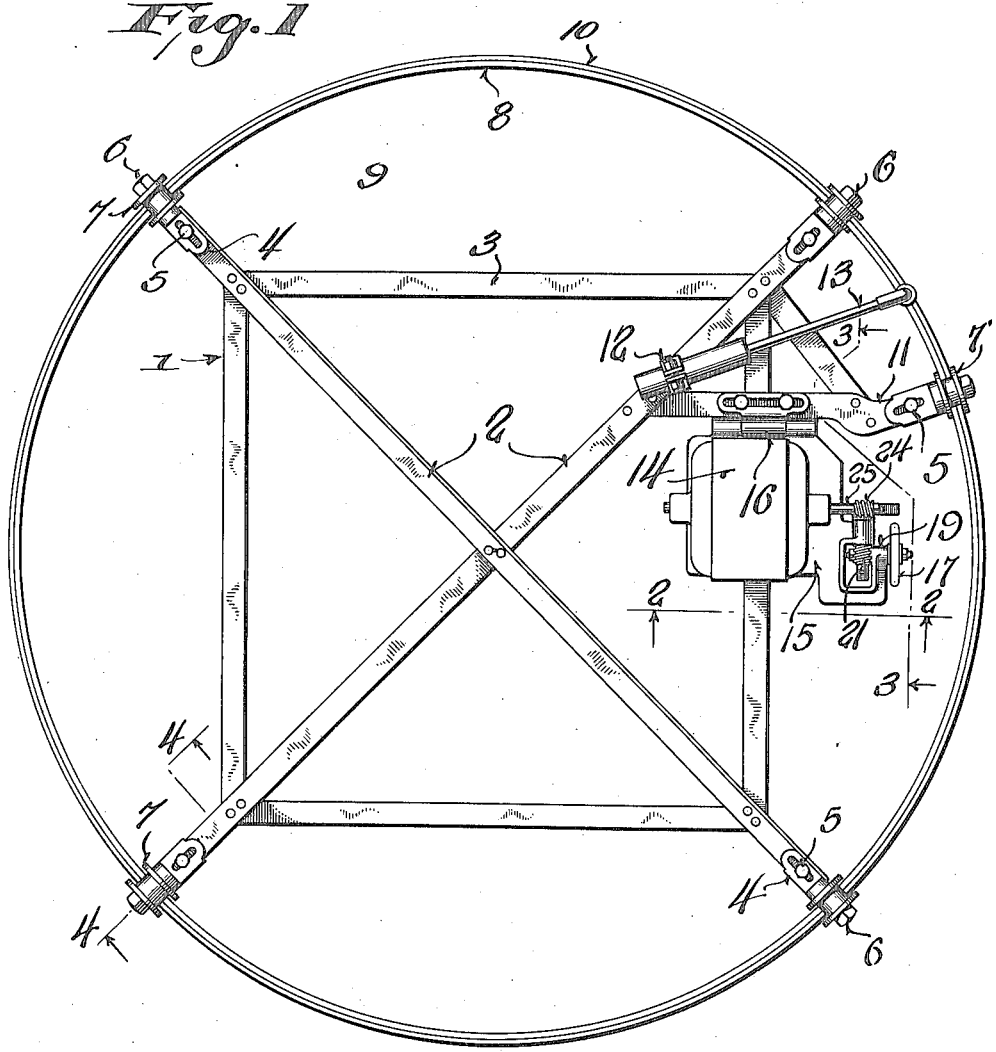
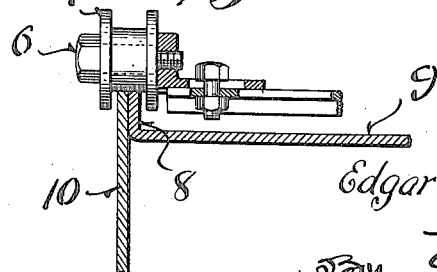

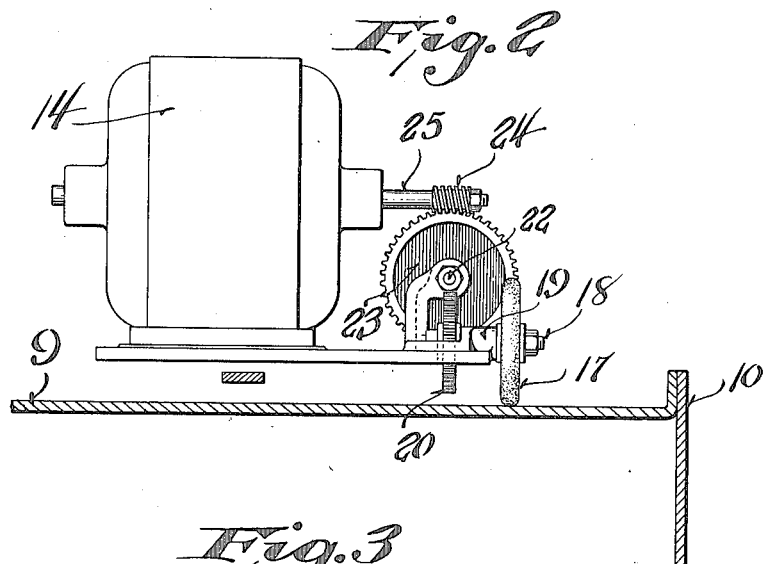
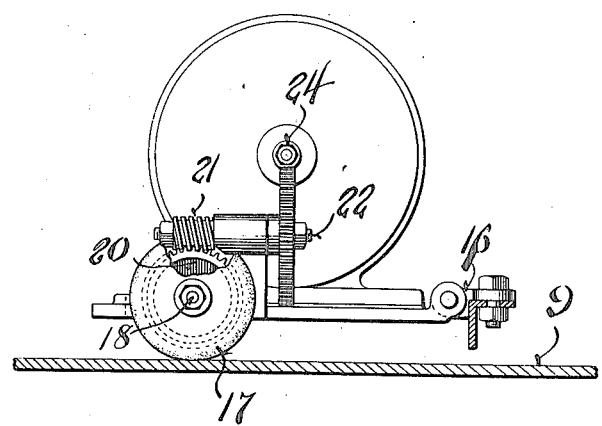

Patented July 1, 1924.

1,499,498

UNITED STATES PATENT OFFICE.

EDGAR A. BIENENSTOK, OF MILWAUKEE, WISCONSIN, ASSIGNOR TO MILWAUKEE TANK WORKS, OF MILWAUKEE, WISCONSIN.

WELDING MACHINE.

Application filed July 2, 1923. Serial No. 649,016.

*To all whom it may concern:*

Be it known that I, EDGAR A. BIENENSTOK, a citizen of the United States, and resident of Milwaukee, in the county of Milwaukee and State of Wisconsin, have invented certain new and useful Improvements in Welding Machines; and I do hereby declare that the following is a full, clear, and exact description thereof.

This invention pertains to welding machines and more particularly to that type employed in welding articles of various kinds, such as tanks and the like.

The primary object of the present invention is to provide a machine of the foregoing character with power driven means for obtaining relative movement between the welding torch and the article to be operated upon.

Another object resides in the provision of novel means for guiding the welding torch with reference to the seam to be welded.

A still further object is to provide a machine, embodying the foregoing characteristics, which is portable and adapted for direct attachment to the article to be operated upon.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1 is an elevational plan view of a machine constructed in accordance with the present invention.

Figure 2 is a detailed sectional view taken on the line 2—2 of Figure 1.

Figure 3 is a detail sectional view taken on the line 3—3 of Figure 1; and

Figure 4 is a detailed sectional view taken on the line 4—4 of Figure 1.

Referring now more particularly to the accompanying drawings wherein I have illustrated that form of the invention adapted to be used in connection with circular tanks for welding the seam between the head and the side of the tank, the numeral 1 designates a skeleton frame composed of the right angularly disposed radial arms 2 which are secured together by means of diagonal braces 3. Mounted on the ends of the arms 2 are the brackets 4 which are slotted for the reception of the bolts 5, whereby their adjustment is obtained.

Threaded into the ends of the brackets are studs 6 which carry the grooved rollers 7, adapted to travel on the track formed by the flange 8 of the head 9 and the upper edge of the side wall 10.

Secured to the frame 1 adjacent one of the arms 2 is an auxiliary arm 11 which is also provided with an adjustable bracket 5 that carries the grooved roller 7'. A bracket 12 is secured to the frame 1 at a convenient location and serves to adjustably carry a welding torch 13 of conventional structure.

As illustrated in Figure 1 the frame 1 is adapted to be mounted directly on the end of a cylindrical tank, the grooved rollers 7 and 7' serving to permit rotary movement of the frame with relation to the head of the tank, and also guiding the frame and torch carried thereby, whereby proper alinement of the torch 13 is obtained with reference to the seam between the side of the tank 10 and the flange 8, which is to be welded.

For the purpose of imparting movement to the frame 1 with relation to the tank whereby the torch travels over the seam to be welded, I provide a motor 14 which is mounted on the plate 15 pivoted to the bracket 16, which bracket has a slotted connection with the auxiliary arm 11, whereby its radial adjustment with relation to the cylindrical head of the tank is obtained. Supporting the plate 15 and engaging the head 9 is a frictional propeller wheel 17 which is mounted on the shaft 18 journalled in the bearing 19 formed in the plate. The inner end of the shaft 18 has secured thereto a worm gear 20 engaged by the worm 21 mounted on the counter shaft 22, which is carried by the bracket 23 secured to the plate 15. At the opposite end, the shaft 22 carries the worm gear 23, which is engaged by the worm 24 carried by the motor shaft 25.

From the foregoing it will be seen that power is imparted to the friction wheel 17 by means of the motor 14 through the reduction gear, as described above, and by means of the pivotal plate 15 which supports the weight of the motor. The proper frictional engagement between the wheel 17 and the head 9 is obtained by means of gravity. Because of the radial adjustability of the bracket 16, it will also be seen that the speed at which the frame is rotated by the friction wheel 17 may be regulated as desired.

In order to compensate for irregularities in the edge of the tank on which the welding machine travels, the grooves in the roller are of sufficient width to permit of slight play while the roller 7', which is positioned closely adjacent the welding torch 13, snugly engages the track, thus insuring proper alinement of the torch with relation to the same. It will also be noted that slight variations in the dimensions of the tank to be welded are accommodated by the adjustment of the brackets 4 with relation to the radial arms 2.

From the foregoing it will be readily seen that a very simple, inexpensive, and efficient welding machine has been provided, which greatly facilitates the operation ordinarily required for welding the seam, and further eliminates the necessity of manual assistance, which reduces the expense incidental to this operation materially, and increases the production.

I claim:—

1. In a seam welding machine, the combination of a motor driven friction wheel engaging the article to be welded for obtaining relative movement between the welding torch with said article, and means connected with the welding torch for guiding the same in proper alinement with the seam.

2. In a seam welding machine, the combination of a frame adapted to be mounted on the article to be welded, a torch carried by said frame, means for propelling said frame on the article, and means for guiding the frame on the article, whereby said torch is properly alined with relation to the seam to be welded.

3. In a portable seam welding machine, the combination of a frame, rollers carried by the frame for engagement with a track carried by the article to be welded, a torch mounted on said frame, and a motor driven friction wheel connected with said frame and engaging the article whereby the frame is propelled on the article.

4. In a portable seam welding machine, the combination of a frame adapted to be mounted on the article to be welded, means for guiding the frame on the article, a torch carried by the frame, a plate pivotally connected to said frame, and a motor driven friction wheel carried by said plate and engaging the article for propelling the frame.

5. In a portable seam welding machine, a frame adapted to be mounted on the article to be welded, rollers for supporting said frame and engaging a track carried by said article whereby the frame is guided on the latter, a torch mounted on the frame, and means for propelling said frame on the article.

In testimony that I claim the foregoing I have hereunto set my hand at Milwaukee, in the county of Milwaukee and State of Wisconsin.

EDGAR A. BIENENSTOK.